US010610049B2

(12) United States Patent
Doglioni Majer

(10) Patent No.: US 10,610,049 B2
(45) Date of Patent: Apr. 7, 2020

(54) BEVERAGE BREWING MACHINE AND METHOD OF PREPARING BEVERAGE

(71) Applicant: CARIMALI S.P.A., Bergamo (IT)

(72) Inventor: Andrea Doglioni Majer, Chignolo D'Isola (IT)

(73) Assignee: CARIMALI S.P.A., Bergaamo (IT)

( * ) Notice: Subject to any disclaimer, the term of this patent is extended or adjusted under 35 U.S.C. 154(b) by 0 days.

(21) Appl. No.: 16/466,726

(22) PCT Filed: Dec. 6, 2017

(86) PCT No.: PCT/IB2017/057698
§ 371 (c)(1),
(2) Date: Jun. 5, 2019

(87) PCT Pub. No.: WO2018/104886
PCT Pub. Date: Jun. 14, 2018

(65) Prior Publication Data
US 2019/0290055 A1 Sep. 26, 2019

(30) Foreign Application Priority Data
Dec. 6, 2016 (IT) .................. 102016000123870

(51) Int. Cl.
*A47J 31/46* (2006.01)
*A47J 31/52* (2006.01)
*A47J 31/00* (2006.01)

(52) U.S. Cl.
CPC ........... *A47J 31/468* (2018.08); *A47J 31/002* (2013.01); *A47J 31/46* (2013.01); *A47J 31/5255* (2018.08)

(58) Field of Classification Search
CPC ........ A47J 31/468; A47J 31/002; A47J 31/46; A47J 31/5255
See application file for complete search history.

(56) References Cited

U.S. PATENT DOCUMENTS 5,309,820 A * 5/1994 Baxter .................. A47J 31/043
99/280
5,697,288 A * 12/1997 King ..................... A47J 31/408
99/289 T (Continued)

FOREIGN PATENT DOCUMENTS

DE 102014018381 A1 6/2016

OTHER PUBLICATIONS

International Search Report and Written Opinion of the International Searching Authority for International Application No. PCT/IB2017/057698 dated Apr. 20, 2018 (11 pgs.).

*Primary Examiner* — Anthony J Weier
(74) *Attorney, Agent, or Firm* — Nixon Peabody LLP

(57) ABSTRACT

Automatic beverage preparation machine with a brewing assembly; brewing material supply device to supply a brewing material dose to the brewing assembly at the beginning of each beverage production cycle; water supply means to supply the brewing assembly with a metered amount of water required to produce a beverage; a beverage-dispensing nozzle in fluid communication with a fluid outlet of the brewing assembly; and brewing process repeating means of the designed to reverse the beverage flow one or more times through the brewing material dose in the brewing assembly before being dispensed into a collection receptacle.

5 Claims, 5 Drawing Sheets

(56) References Cited

U.S. PATENT DOCUMENTS

| | | | | |
|---|---|---|---|---|
| 5,913,963 A | * | 6/1999 | King | A47J 31/18 99/285 |
| 7,858,135 B2 | * | 12/2010 | Radosav | A47J 31/18 426/431 |
| 8,975,085 B2 | * | 3/2015 | Howells | B01F 1/0027 436/174 |
| 2006/0096464 A1 | | 5/2006 | Blanc | |
| 2007/0095213 A1 | | 5/2007 | Blanc | |
| 2012/0196014 A1 | * | 8/2012 | Yao | A23F 5/208 426/433 |

* cited by examiner

BEVERAGE BREWING MACHINE AND METHOD OF PREPARING BEVERAGE

CROSS-REFERENCE TO RELATED PATENT APPLICATIONS

The present application is a national stage application under 35 U.S.C. § 371 of International Application No. PCT/IB2017/057698, filed Dec. 6, 2017, entitled "BEVERAGE BREWING MACHINE," which claims priority to Italian Patent Application No. 102016000123870, filed Dec. 6, 2016, both of which are incorporated by reference herein in their entireties.

TECHNICAL FIELD OF THE INVENTION

The present invention relates to an automatic machine for preparing brewed beverages, in particular coffee or tea-based beverages, and to the related automatic brewing process.

PRIOR ART

As known, a brewed beverages preparation process generally comprises causing a hot liquid to flow, in a shorter or longer time, through a dose of anhydrous material, for example ground coffee or leaf tea, so that soluble substances, aroma and taste of the anhydrous material are extracted and released into the liquid.

In the field of automatic machines for preparing beverages, various techniques are known for automatically carrying out such brewing process. Said techniques substantially differ from each other in the ways and times in which the hot brewing liquid, normally water, is supplied through the anhydrous material. Therefore, different brewed beverages may be obtained depending on the used brewing technique and on the characteristics of the initial anhydrous material, in particular its grinding fineness and homogeneity.

By way of example, the following are the most commonly used brewing techniques in the field of automatic machines for producing beverages:

- high pressure percolation: this technique, which consists in hot water at high pressure flowing through a layer of ground material, enclosed between two filters to retain the waste material, is normally used to manufacture, e.g. the so-called espresso coffee;
- low pressure percolation (or aspiration): this technique, which consists in hot water at low pressure flowing through a layer of ground material, deposited on a filter, is normally used to manufacture, e.g. the so-called filter coffee or leaf tea;
- mixing at atmospheric pressure: this technique, which consists in mixing hot water and finely ground material without any subsequent filtration, is normally used to manufacture, e.g. the so-called Turkish coffee.

In general, whatever the applied technique, the success of an automatic brewing process is influenced by several parameters and is "quantifiable" in the so-called "percentage extraction yield", i.e. the ratio between the amount of solute in the beverage and the amount of anhydrous material.

Some of the fundamental parameters influencing the automatic brewing process are, for example, water temperature and pressure, contact time between anhydrous material and water, ratio between material mass and water and material granulometry.

Generally speaking, each type of beverage is associated to an optimal value of the percentage extraction yield; a yield, which is lower or higher than the optimal one indicates an under-extraction or, respectively, an over-extraction of the beverage.

From the foregoing, it is clear how the selection of the brewing parameters represents one of the main problems of automatic machines for producing beverages, especially since this selection of brewing parameters must be made not only to obtain an extraction yield that guarantees the quality of the obtained beverage, but also taking into account the efficiency of the automatic machine.

In fact, brewing parameters, and among these, in particular, heating temperature of the brewing liquid, material dose necessary for preparing a beverage and extraction time, directly influence the performance of the machine, in particular meant as a saving of direct costs, namely production costs, and indirect costs, namely management costs, of the machine.

In the last decades, many efforts have been made to obtain automatic machines for producing different types of beverages through respective different automatic brewing processes, with a satisfactory percentage of extraction yield for each process and without jeopardising the machine performance.

A proposed solution provides the repetition of the brewing process, thus increasing the contact time of the extraction fluid with the brewing material and, consequently, controlling the extraction. This principle is e.g. at the basis of the machines described in US 2006/0096464 and US 2007/0095213, which disclose the use of a recirculation branch and of valve means for controlling the flow of the beverage through the hydraulic circuit.

OBJECT AND SUMMARY OF THE INVENTION

The object of the present invention is to provide an automatic machine for producing beverages having a new structure, which simply and inexpensively allows increasing the efficiency of the automatic brewing process, in particular improving the energy performance, with respect to known automatic machines, at the same time allowing a real-time control of the extraction yield, and therefore of the quality of the extracted beverage, and a possible correction of any under-extraction.

A further advantage of the automatic machine of the present invention consists in making with the same machine not only hot beverages, like any traditional automatic machine for producing beverages, but also cold beverages.

According to the present invention, it is provided an automatic machine and a method for preparing beverages according to what claimed in the attached claims.

BRIEF DESCRIPTION OF THE DRAWINGS

The invention will now be described with reference to the accompanying drawings showing an example of a non-limiting embodiment, in which.

DETAILED DESCRIPTION OF PREFERRED EMBODIMENTS OF THE INVENTION

The present invention will now be described in detail with reference to the attached figures to allow a skilled person to manufacture and use it. Various modifications to the described embodiments will be immediately apparent to those skilled in the art. The described general principles may be applied to other embodiments and applications without thereby departing from the scope of the present invention, as defined in the appended claims. Therefore, the present invention should not be considered limited to the embodiments described and shown, but it must be granted the widest scope of protection in accordance with the principles and characteristics described and claimed herein.

Figure 1:
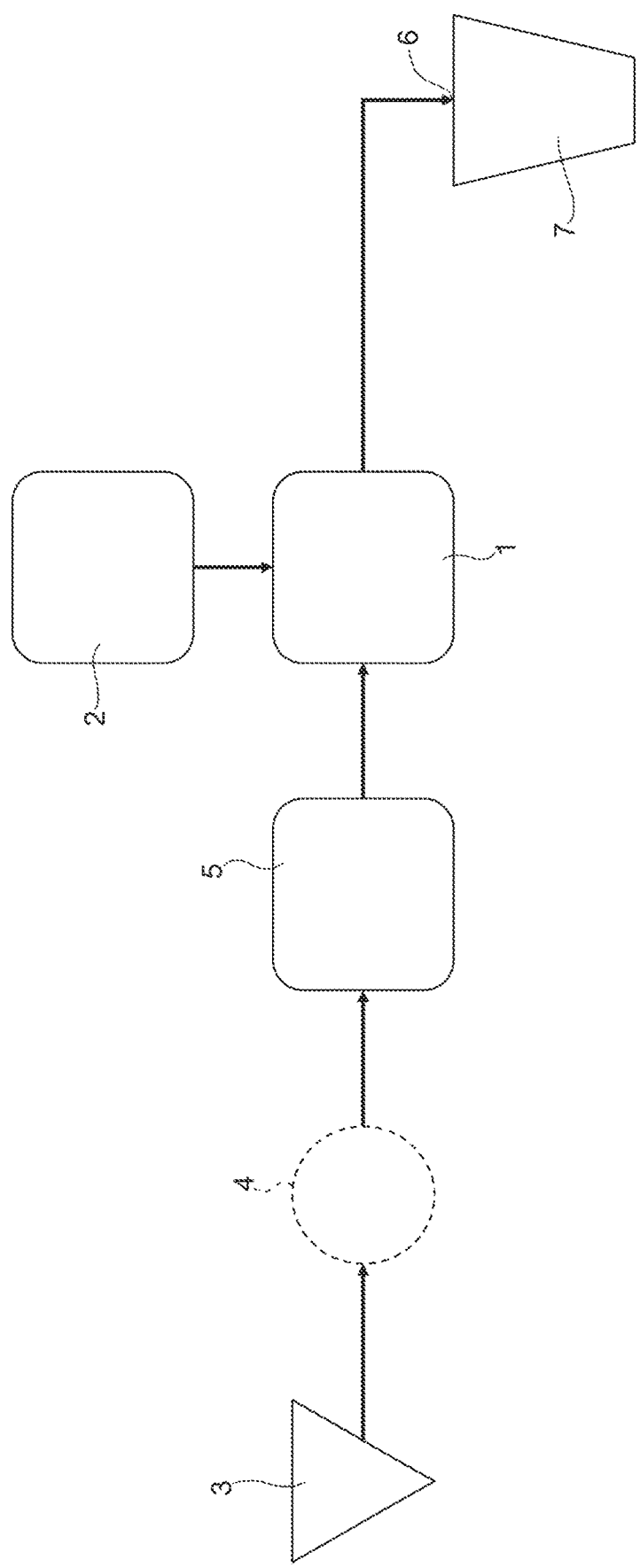
FIG. 1 schematically shows the structure of an automatic machine for producing beverages according to the prior art.

FIG. 1 shows a block diagram which represents in a simplified and functional way the elements of an automatic machine for producing brewed beverages according to the prior art.

By way of example, the automatic machine schematically shown in FIG. 1 is a machine provided with a known automatic brewing assembly 1 commonly used for the production of coffee or leaf tea. The brewing assembly 1 is associated with an automatic dispenser 2 supplying a metered amount of material to be brewed to the brewing assembly 1, at the beginning of each brewing cycle. Typically, the automatic dispenser 2 is formed by a tank provided with a dispenser or, in the case of a coffee preparation, by a controlled grinding device delivering a predetermined amount of ground coffee.

According to a variant, the brewing assembly 1 could be semi-automatic, namely the anhydrous material could not be automatically supplied but manually supplied by the user by loading a dose of material to be brewed in the form of loose material or of a single-dose capsule or pod of known type.

According to what shown in FIG. 1, upstream of the brewing assembly 1, the automatic machine comprises a water source 3, which generally consists of a water tank or an inlet valve in fluid communication with the water network. If necessary, a volumetric counter (not shown) is arranged downstream of the water source 3 to measure the amount of water coming from the water source 3.

Between the water source 3 and the brewing assembly 1, the automatic machine comprises, serially and in this order, a pump 4 and a water temperature regulator 5.

In particular, the pump 4 is an optional element, being indispensable only in cases where the type of beverage produced by the machine requires that the brewing water pressure supplied to the brewing assembly 1 be increased to a pressure higher than the atmospheric pressure, as e.g. in cases of low or high pressure percolation. The pump 4 generally consists of a peristaltic or centrifugal or vibrating pump. If the pump 4 is volumetric, as in the case of the peristaltic pump, the water supplied to the brewing assembly 1 is dosed by the pump 4 and therefore a volumetric counter associated with the water source 3 is not necessary.

The water temperature regulator 5 generally consists of a boiler or a thermo-block for increasing or decreasing the temperature of the inlet water up to a predetermined value.

In use, after having flowed through the pump (if present) and the water temperature regulator 5, the brewing water enters the brewing assembly 1, flows in a shorter or longer time through the ground material inside the brewing assembly 1 and finally leaves the brewing assembly 1 and reaches a dispensing nozzle 6 to flow into a beverage collection receptacle 7.

As shown by the diagram of FIG. 1, the blocks flowed through by the brewing water are cascade-connected, i.e. the outlet of a block is directly connected to the inlet of the next block. In fact, the structure of the known automatic machine is such that the brewing water moves one-way along the whole circuit, in particular through the brewing assembly 1, during the same brewing cycle.

Figure 2:
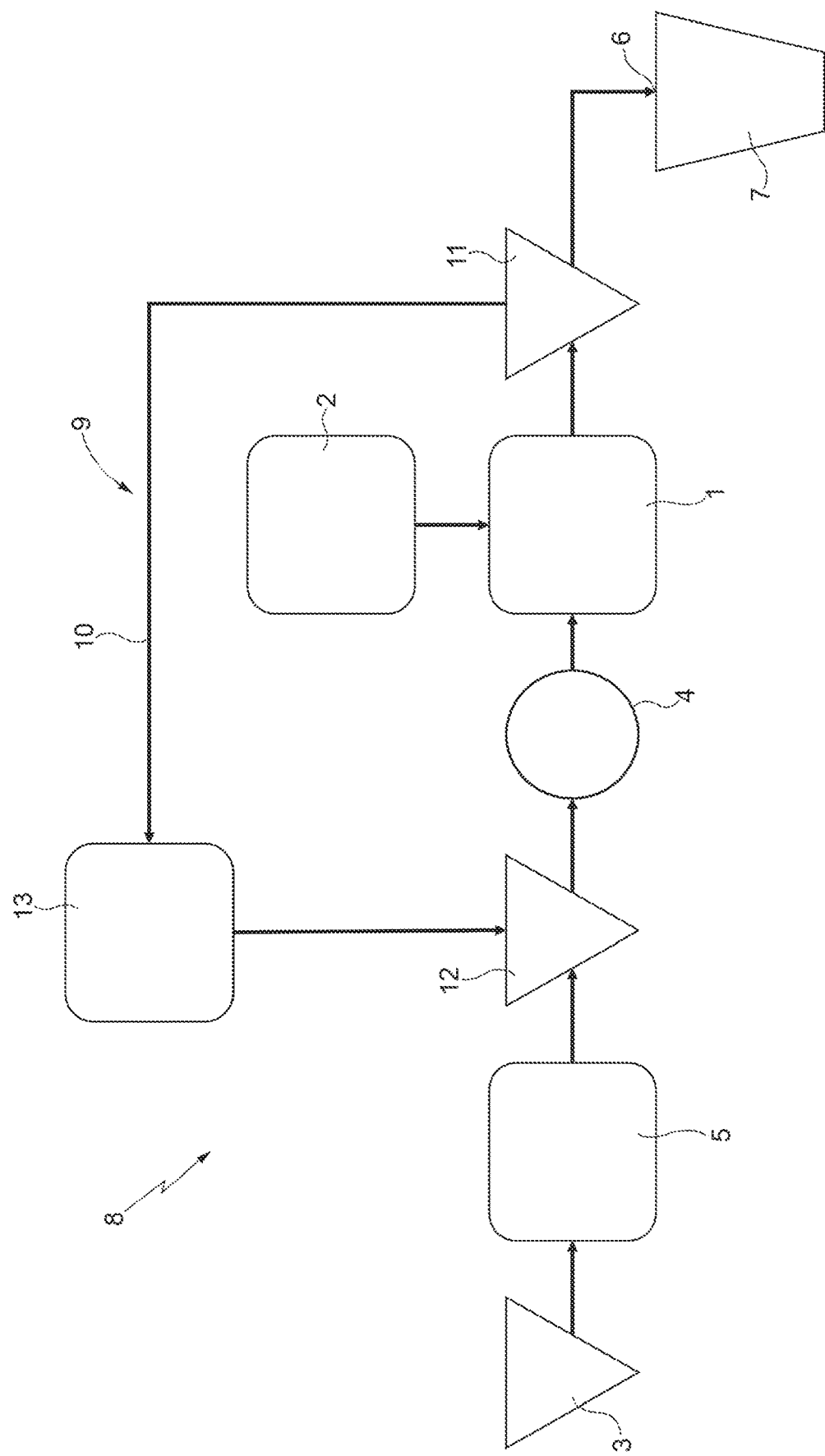
FIG. 2 schematically shows the structure of an automatic machine for producing beverages according to the prior art.

FIG. 2 shows a block diagram showing in a simplified and functional way the elements of a further automatic machine for producing beverages of the prior art.

As shown below, some of the elements of the machine of FIG. 2 also belong to the known machine of FIG. 1, thus bearing, when possible, the same reference numbers.

The automatic machine schematically shown in FIG. 1 and indicated as a whole with the reference number 8 is characterized by being provided with a recirculation system 9 to intercept the brewing fluid at the outlet of the brewing assembly 1 and to make it flow again through the material dose in the brewing assembly 1 for a predetermined number of times.

As shown in FIG. 2, the machine 8 comprises a brewing assembly 1, a dispenser 2 of the material to be brewed, a beverage-dispensing nozzle 6, a water source 3, a water temperature regulator 5 arranged downstream of the water source 3 and a pump 4, whose presence is not required if the brewing process does not require a pressure increase of the brewing fluid above the atmospheric pressure.

When present, the pump 4 is arranged between the water temperature regulator 5 and the brewing assembly 1.

As already stated, the water temperature regulator 5 can be a boiler or a thermo-block raising the temperature of the water coming from the water source 2. Alternatively, the temperature regulator 5 can be a cooling device or a mixing device for mixing cold and hot water to bring the brewing water to a predetermined final temperature.

The aforementioned recirculation system 9 aims to reuse the brewed beverage as brewing fluid by recirculating the beverage through the brewing assembly 1 in the same flow direction of the brewing water, i.e. from the inlet to the outlet of the brewing assembly 1, thus carrying out a one-way brewing process. For this purpose, the recirculation system 9 comprises a recirculation branch 10, which, as shown below, can be flowed through by the brewing fluid in the opposite direction with respect to the flow direction through the brewing assembly 1 and is in fluid communication with the rest of the circuit by means of two three-way flow diverters 11 and 12, preferably but not necessarily defined by three-way solenoid valves connected to an electronic control unit (not shown) of the machine 8.

In particular, the flow diverter 11 is arranged between the brewing assembly 1 and the beverage-dispensing nozzle 6 so that an outlet of the brewing assembly 1 is selectively in fluid communication with the beverage-dispensing nozzle 6 or with an inlet of the recirculation branch 10.

The flow diverter 12 is arranged between the water temperature regulator 5 and the pump 4 (or the brewing assembly 1, if the pump 4 is missing) so that an outlet of the water temperature regulator is selectively in fluid communication with a suction duct of the pump 4 (or with the inlet of the brewing assembly 1 if the pump 4 is missing) or with an outlet of the recirculation branch 10.

The recirculation system 9 further comprises a tank 13 arranged along the recirculation branch 10 for temporarily collecting the beverage which, leaving the brewing assembly 1, is diverted on the recirculation branch 10 before flowing again through the brewing assembly 1.

Alternatively, the tank 13 could be omitted and the recirculation branch 10 could be sized to define a suitable storage volume.

The main steps of the brewing process carried out by the machine 8 are briefly described below. The structure of the machine 8 allows both a traditional brewing process, described below under point a), and a non-traditional brewing process, described below under point b), characterized by the repetition of the brewing step by reusing the extracted beverage as extraction fluid.

In the case of the machine 8 of FIG. 2, this "repetitive" process is carried out by means of a recirculation system originating a one-way brewing process. This type of process is particularly advantageous when brewing at low or atmospheric pressure.

Operating mode of the machine 8 of FIG. 2:

a) "TRADITIONAL" ONE-WAY MODE

In this case, the brewing process involves the following steps:

a1—the brewing assembly 1 is supplied by the dispenser 2 with a dose of material to be brewed;

a2—the brewing water from the water source 3 is brought to a predetermined temperature by the water temperature regulator 5;

a3—the pump 4 (if present) supplies the water to the brewing assembly 1;

a4—the beverage produced by the brewing assembly 1 flows towards the beverage-dispensing nozzle 6 and, therefore, into the collection receptacle 7.

During operation of the machine 8 according to the "traditional" one-way mode, the flow deviators 11 and 12 are controlled so as to exclude the recirculation branch 10 from the circuit.

b) "REPETITIVE" ONE-WAY MODE

In this case, the brewing process involves the following steps:

b1—the brewing assembly 1 is supplied by the dispenser 2 with a dose of material to be brewed;

b2—the brewing water from the water source 3 is brought to a predetermined temperature by the water temperature regulator 5;

b3—the pump 4 (if present) supplies the water to the brewing assembly 1; in this phase, the flow diverter 12 is controlled so that the water source 3 is in fluid communication with the pump 4 and that the fluid communication path with the recirculation branch 10 is inhibited, and the flow diverter 11 is controlled so that the outlet of the brewing assembly 1 is in fluid communication with the inlet of the recirculation branch 10 and that the fluid communication with the beverage-dispensing nozzle 6 is inhibited;

b4—the beverage leaving the brewing assembly 1 flows along the recirculation branch 10 and is temporarily collected in the tank 13;

b5—after that a determined amount of water has been supplied to the brewing assembly 1 or after a determined period of time, the water supply means are stopped and the flow diverter 12 is operated so that the communication with the water source 3 is inhibited and that the outlet of the recirculation branch 10 is in fluid communication with the pump 4 (or with the inlet of the brewing assembly 1 if the pump 4 is missing);

b6—the beverage collected in the tank 13 is supplied to the brewing assembly 1 so as to flow again through the brewing material; this beverage recirculation operation involving a repeated brewing process is performed for a determined number of times or, alternatively, for a determined period of time or after that a given amount of beverage has been dispensed;

b7—once the recirculation and re-brewing phase of the beverage has been completed, the flow diverter 11 is operated so that the access to the recirculation branch 10 is inhibited but the outlet of the brewing assembly 1 is connected to the beverage-dispensing nozzle 6, thus allowing the beverage to reach the collection receptacle 7.

Figure 3:
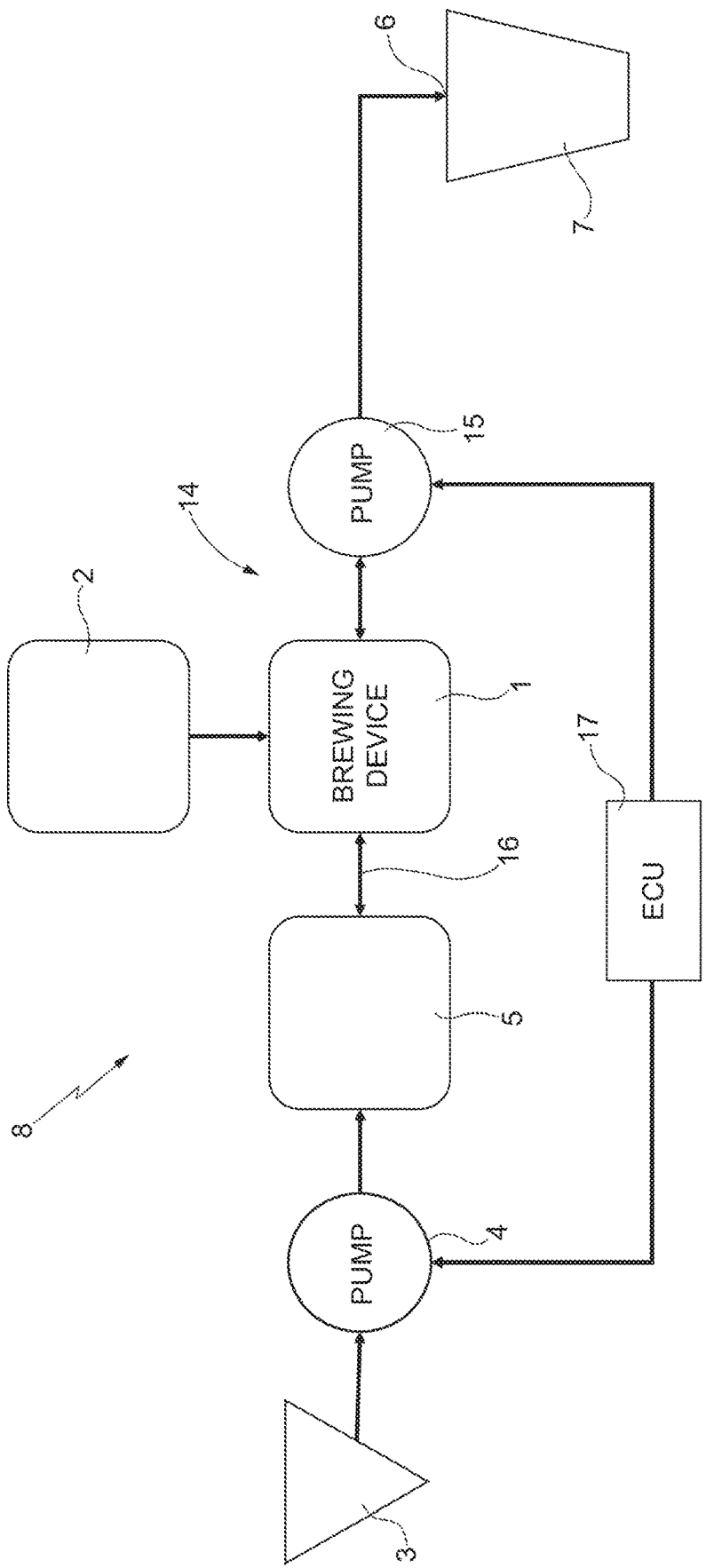
FIG. 3 schematically shows the structure of a preferred embodiment of an automatic machine according to the present invention.

FIG. 3 shows a block diagram showing in a simplified and functional way the elements of an automatic machine 8 for the production of beverages according to the present invention.

The machine 8 of FIG. 3 has the following components in common with the automatic machine 8 of FIG. 2: a brewing assembly 1, a dispenser 2 of the material to be brewed, a beverage-dispensing nozzle 6, a water source 3, a pump 4 and a water temperature regulator 5, which, also in this case, may be a boiler, a thermo-block, a cooling device or a mixing device for mixing cold and hot water to obtain a predetermined temperature.

Unlike the aforesaid example referring to FIG. 2, in this case the pump 4 is arranged between the water source 3 and the water temperature regulator 5. However, according to a variant not shown, the pump 4 could even be placed downstream of the water temperature regulator 5.

Since the machine 8 of the embodiment shown in FIG. 3 is particularly suitable for making high pressure brewed beverages, the pump 4 is usually always present to allow an adequate increase in the pressure of the brewing fluid supplied to the brewing assembly 1.

However, according to a variant not shown, if the brewing is carried out at low pressure or atmospheric pressure, the pump 4 may be missing and the brewing fluid can be supplied to the brewing assembly 1 by means of other suitable systems, e.g. by gravity.

The machine 8 of FIG. 3 is based on the same operating principle of the machine 8 previously described with reference to FIG. 2, i.e. on the principle of using the beverage as a brewing fluid, forcing it to flow through the material to be brewed, previously supplied to the brewing assembly 1, for a determined number of times.

For this purpose, however, the machine 8 of FIG. 3 is not provided with a beverage recirculation system 9, namely with the recirculation branch 10, the tank 13 and the flow deviators 11 and 12, but with an inversion system 14 of the beverage flow direction, which, once dispensed by the brewing assembly 1, is alternately pushed towards the outlet and backwards, towards the inlet of the brewing assembly 1.

The inversion system 14 comprises the pump 4 (when present) and a further pump 15, which is arranged between the brewing assembly 1 and the beverage-dispensing nozzle 6 and, like the pump 4, is conveniently a centrifugal pump or a peristaltic pump, but any other suitable type of pump could be used, in particular a pump which is technically suitable for the treatment of a liquid potentially loaded with particulates.

The pumps 4 and 15 are connected to the electronic control unit, designated by the reference number 17, to be operated, in use, to control the flow and direction of the beverage flow. In particular, they are operated to simultaneously impart to the beverage a thrust in a direction that, at any time of the brewing process, is the same for both pumps and, during the brewing process, is reversed at determined time intervals to check the amount of beverage flowing back through the brewing assembly 1.

In this regard, it should be specified that the water temperature regulator 5 and the inlet of the brewing assembly 1 are in fluid communication by means of a duct 16 whose capacity is selected so that the amount of beverage flowing back through the brewing assembly 1 does not enter the water temperature regulator 5.

When the pump 4 is missing, the brewing circuit upstream of the pump 15 is tight and allows the only pump 15 to suck the brewing liquid from the source 3 through the brewing assembly 1.

According to a variant not shown, moreover, the duct 16 is provided with a collection receptacle (not shown) which allows a temporary collection of that portion of the beverage which, driven backwards, flows back through the brewing assembly 1.

The main steps of the brewing process are briefly described below by means of the machine 8 shown in FIG. 3.

Analogously to what previously said with regard to the embodiment of FIG. 2, also in this case the structure of the machine 8 allows both a traditional process, described under point c), and a non-traditional brewing process, described under point d), characterized by the repetition of the brewing step by reusing the extracted beverage as extraction fluid.

In the case of the machine 8 of FIG. 3, this "repetitive" process is carried out by means of an inversion system of the beverage flow direction, originating a two-way brewing process. This type of process is particularly advantageous when brewing at high pressure.

Operating mode of the machine 8 of FIG. 3:

c) "TRADITIONAL" ONE-WAY MODE

In this case, the brewing process is analogous to the one of the known brewing machines and involves the following steps:

c1—the brewing assembly 1 is supplied by the dispenser 2 with a dose of material to be brewed;

c2—the pump 4 (if present) increases the pressure of the water from the water source 3 and supplies it to the water temperature regulator 5, which brings it to a predetermined temperature, and to the brewing assembly 1;

c3—the beverage produced by the brewing assembly 1 is pushed by the pump 15 towards the beverage-dispensing nozzle 6 and, therefore, into the collection receptacle 7.

d) "REPETITIVE" TWO-WAY MODE

In this case, the brewing process involves the following steps:

d1—the brewing assembly 1 is supplied by the dispenser 2 with a dose of material to be brewed;

d2—the water source 3 supplies water to the water temperature regulator 5, which brings it to a predetermined temperature;

d3—the pump 4 (if present) and the pump 15 are actuated to simultaneously push the water in the normal brewing direction, i.e. from the water source 3 towards the beverage-dispensing nozzle 6; the pump 4 increases the water pressure and supplies it to the brewing assembly 1;

d4—after that a certain amount of water has been supplied to the brewing assembly 1 or after a determined period of time, the electronic control unit (not shown) synchronously reverses the thrust direction of the pump 4 and of the pump 15 so that the beverage produced by the brewing assembly 1 forcibly flows back through the material into the brewing assembly 1, without recirculation out of the brewing assembly (1);

d5—after a certain period of time, preferably between 1 and 5 seconds, the pumps 4 and 15 reverse once again the thrust direction, thus forcing the beverage that had flowed through the brewing assembly 1 through the brewing assembly in the normal flow direction towards the beverage-dispensing nozzle 6;

d6—after a determined number of inversions or a determined time period, the pumps 4 and 15 maintain their thrust in the normal flow direction towards the beverage-dispensing nozzle 6 until the beverage is dispensed.

Figure 4:
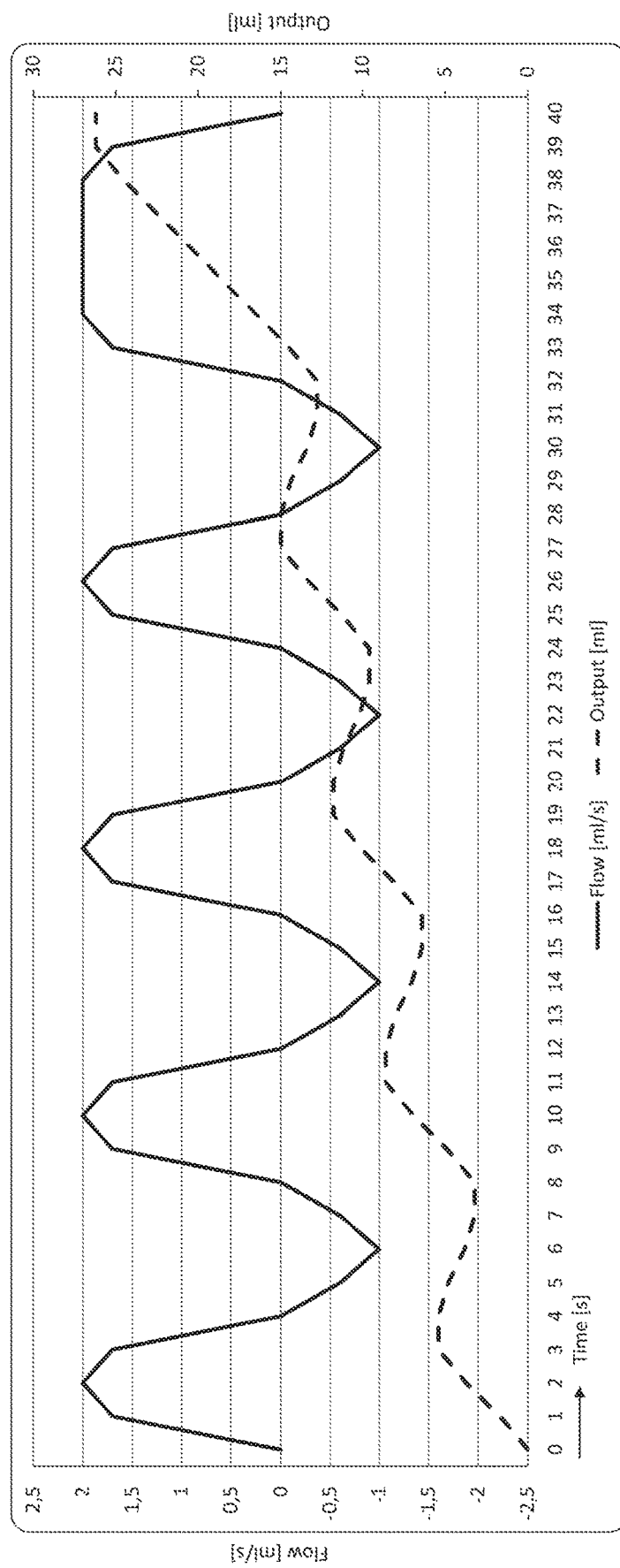
FIGS. 4 and 5 show respective graphs representing the progress of the brewing process of the machine of the present invention.
Figure 5:
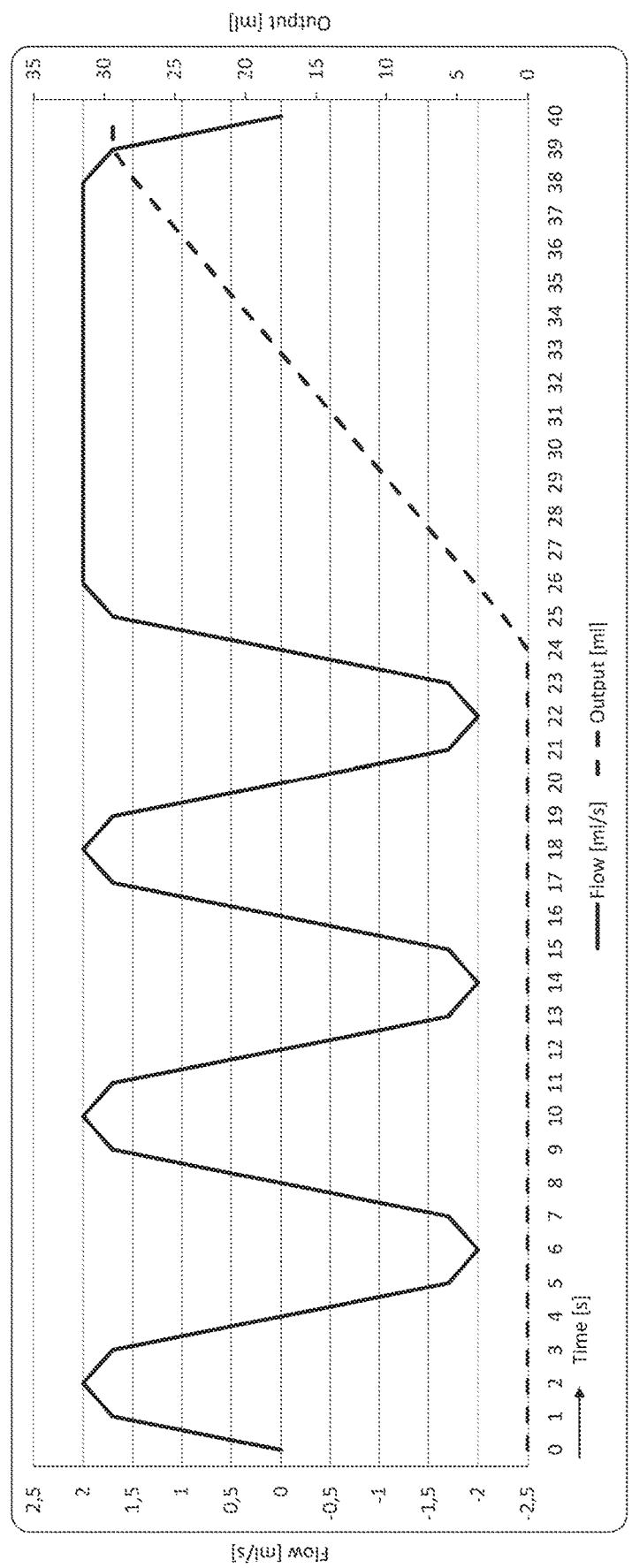

FIGS. 4 and 5 show two graphs, which are related to two different control modes of the pumps 4 and 15 and represent the flow rates of the brewing fluid (indicated with a continuous line) and of the amount of beverage leaving the beverage-dispensing nozzle 6 (indicated with a dashed line) during a beverage production cycle.

To complete the above, it should be noted that in the aforesaid and not shown case in which the machine 8 is used for brewing processes that do not require a high pressure brewing fluid, the pump 4 is not necessary and that instead a shut-off valve is used, which is controlled by the electronic control unit 17 to allow the flow of the brewing water when the pump 15 pushes the beverage towards the dispensing nozzle 6 and to inhibit the flow of the brewing water when the pump 15 is reversed and pushes the beverage back towards, and through, the brewing assembly 1.

In the light of the foregoing, here are some relevant considerations regarding the advantages deriving from the use of the automatic machine of the present invention, schematically shown in FIG. 3. In fact, unlike known systems, the present invention simply and inexpensively reaches the aim of repeating the brewing process for a certain number of times during the same beverage production cycle to increase the contact time with the material to be brewed, thus improving the extraction of soluble substances, aroma and flavour. This result is obtained by providing a pump downstream of the brewing device and by suitably sizing the circuit capacity, without introducing further components, such as a recirculation branch and complex flow control valve means.

Therefore, the machine of the present invention allows, without introducing significant structural complications, but thanks to an extremely simple and efficient circuit, repeating the brewing process thus obtaining an overall increase in the efficiency of the automatic machine, since:

- it allows reducing the necessary material dose; the repeated passage of the brewing liquid allows, in fact, a better "exploitation" of the material if compared with a single-passage extraction;
- it allows reducing energy consumption, since it uses temperatures closer to the environment temperature. In fact, while traditional systems require water at a relatively high temperature for the extraction of soluble substances and aroma from the material during the passage of water through the material, in the present invention the complete extraction of soluble substances and aroma is progressively obtained as a consequence of the repeated passages of the beverage through the material. Moreover, the use of lower brewing temperatures results into a better quality of the beverage since it reduces the extraction of harmful soluble substances, which is instead favoured by a high temperature brewing;
- it allows a user to produce hot beverages and cold beverages with the same machine; in this regard, it should be noted that automatic machines currently available on the market are not able to produce cold beverages, since traditional brewing systems providing a single passage through the material to be brewed would not possibly obtain a satisfactory extraction within a reasonable time.

A further advantage of the automatic machine of the present invention is allowing a correction "in real time" of the beverage extraction yield. In fact, by equipping the automatic machine with a detecting device for measuring the extraction yield of the beverage that is being produced by the brewing assembly 1, it is possible to control the brewing process based on what detected by the detecting device, for example by repeating the brewing process if the beverage is under-extracted.

The invention claimed is:

1. An automatic beverage preparation machine comprising:
   a brewing assembly with a fluid inlet, a fluid outlet, and a brewing material inlet;
   a brewing material supply device in communication with the brewing material inlet of the brewing assembly to supply the latter with a brewing material dose at a beginning of each beverage production cycle;
   a water supply means in fluid communication with the fluid inlet of the brewing assembly to supply the latter with a metered amount of water required to produce a beverage;
   a beverage dispensing nozzle in fluid communication with the fluid outlet of the brewing assembly;
   a brewing process repeating means designed to cause the beverage to flow one or more times through the brewing material dose in the brewing assembly before being dispensed into a collection receptacle the brewing process repeating means including a beverage flow reversing means designed to reverse the beverage flow through the brewing assembly without recirculation out of the brewing assembly, the beverage flow reversing means having a pump arranged between the fluid outlet of the brewing assembly and the beverage dispensing nozzle; and an electronic control unit configured to control the pump to cause the beverage to flow through the brewing material dose from the fluid outlet to the fluid inlet of the brewing assembly and vice versa so as to result in a two-way brewing process without recirculating the beverage out of the brewing assembly.

2. The machine according to claim 1, further comprising a device for measuring an extraction beverage yield of the beverage dispensed by the brewing assembly, wherein the electronic control unit is further configured to feedback control the two-way brewing process based on the measured extraction beverage yield so as to repeat the brewing process when the beverage is determined to be under-extracted.

3. The machine according to claim 1, wherein said water supply means comprises a water source and a further pump arranged between the water source and the brewing assembly to appropriately increase water pressure supplied to the brewing assembly.

4. The machine according to claim 3, wherein the electronic control unit is further configured to control said pumps such that the pumps simultaneously impart to the beverage respective trusts that at any time of the brewing process are directed in the same direction and that are reversed at predetermined time intervals during the brewing process so as to control an amount of beverage flowing back through the brewing assembly.

5. A method for automatically preparing beverages, comprising:
   providing a brewing assembly with a fluid inlet, a fluid outlet, and a brewing material inlet;
   providing a beverage dispensing nozzle in fluid communication with the fluid outlet of the brewing assembly;
   supplying a dose of brewing material to the brewing material inlet of the brewing assembly at a beginning of each beverage production cycle;
   supplying a metered amount of water required to produce a beverage to the fluid inlet of the brewing assembly for producing the beverage;
   causing the beverage to flow one or more times through the brewing material dose in the brewing assembly before being dispensed into a collection receptacle;
   wherein the causing the beverage to flow one or more times through the brewing material dose in the brewing assembly comprises:
      arranging a pump between the fluid outlet of the brewing assembly and the beverage dispensing nozzle, and
      controlling the pump so as to cause the beverage to flow through the brewing material dose from the fluid outlet to the fluid inlet of the brewing assembly and vice versa, so as to result in a two-way brewing process without recirculating the beverage out of the brewing assembly.

* * * * *